US012770148B2

(12) United States Patent
Watson et al.

(10) Patent No.: US 12,770,148 B2
(45) Date of Patent: Oct. 20, 2026

(54) COOPERATIVE FRAUD-DETECTION PROCESSING

(71) Applicant: NCR Atleos Corporation, Atlanta, GA (US)

(72) Inventors: Patrick Goode Watson, Johns Creek, GA (US); David Charles Means, Woodstock, GA (US); Nir Veltman, Johns Creek, GA (US)

(73) Assignee: NCR Atleos Corporation, Atlanta, GA (US)

( * ) Notice: Subject to any disclaimer, the term of this patent is extended or adjusted under 35 U.S.C. 154(b) by 1021 days.

(21) Appl. No.: 15/719,158

(22) Filed: Sep. 28, 2017

(65) Prior Publication Data

US 2019/0095922 A1 Mar. 28, 2019

(51) Int. Cl.
*G06Q 20/40* (2012.01)
*G06Q 20/38* (2012.01)

(52) U.S. Cl.
CPC ..... *G06Q 20/4016* (2013.01); *G06Q 20/3827* (2013.01)

(58) Field of Classification Search
CPC ........................................ G06Q 20/00–425
See application file for complete search history.

(56) References Cited

U.S. PATENT DOCUMENTS

| | | | | |
|---|---|---|---|---|
| 2002/0161647 A1* | 10/2002 | Gailey | G06F 16/9537 | 705/14.23 |
| 2002/0194119 A1* | 12/2002 | Wright | G06Q 30/0609 | 705/38 |
| 2007/0234409 A1* | 10/2007 | Eisen | H04L 67/02 | 726/6 |
| 2011/0246369 A1* | 10/2011 | de Oliveira | G06Q 20/40 | 705/64 |
| 2012/0047072 A1* | 2/2012 | Larkin | G06Q 20/3255 | 705/44 |
| 2015/0161609 A1* | 6/2015 | Christner | G06Q 20/4016 | 705/44 |
| 2017/0132626 A1* | 5/2017 | Kennedy | G06Q 20/401 | |
| 2018/0075453 A1* | 3/2018 | Durvasula | G06Q 20/389 | |

* cited by examiner

*Primary Examiner* — Mohammad A. Nilforoush
(74) *Attorney, Agent, or Firm* — Schwegman Lundberg & Woessner, P. A.

(57) ABSTRACT

A portion of information is cryptographically hashed to obtain a hash value. The hash value is submitted as a search to shared cryptographic cooperatively shared transaction data structure and results are obtained for previous transactions associated with the information. A decision is made as to whether a pending transaction for the information is to be submitted to a host for processing or whether the pending transaction is to be denied before the information is provided to the host.

4 Claims, 4 Drawing Sheets

COOPERATIVE FRAUD-DETECTION PROCESSING

BACKGROUND

Merchants incur fees whenever they submit payment requests to payment hosts, even if a transaction is declined for payment by the hosts. Merchants also assume risks even when the payment is accepted by the hosts for processing because chargebacks can occur where the customer disputes the payment to the merchant.

Fees and chargebacks are substantial expenses for merchants. Furthermore, it is usually the payment hosts that deploy fraud detection techniques to protect the hosts. The merchants have no real solution for declining payments and managing their risks with the payments before the payments are submitted to the hosts and once the payments are submitted to the hosts, fees are incurred by the merchants regardless as to whether the payments are processed or not.

SUMMARY

In various embodiments, methods and a system for cooperative fraud-detection processing are presented.

According to an embodiment, a method for I cooperative fraud-detection processing is presented. More particularly, a hash is calculated from identifying information of a payment instrument. The hash is submitted as a search to a cooperatively shared transaction data structure and results are obtained in response to the search. Next, a determination is made as to whether to provide a transaction to a host for processing or whether to deny the transaction without sending the transaction to the host.

DETAILED DESCRIPTION

Figure 1:
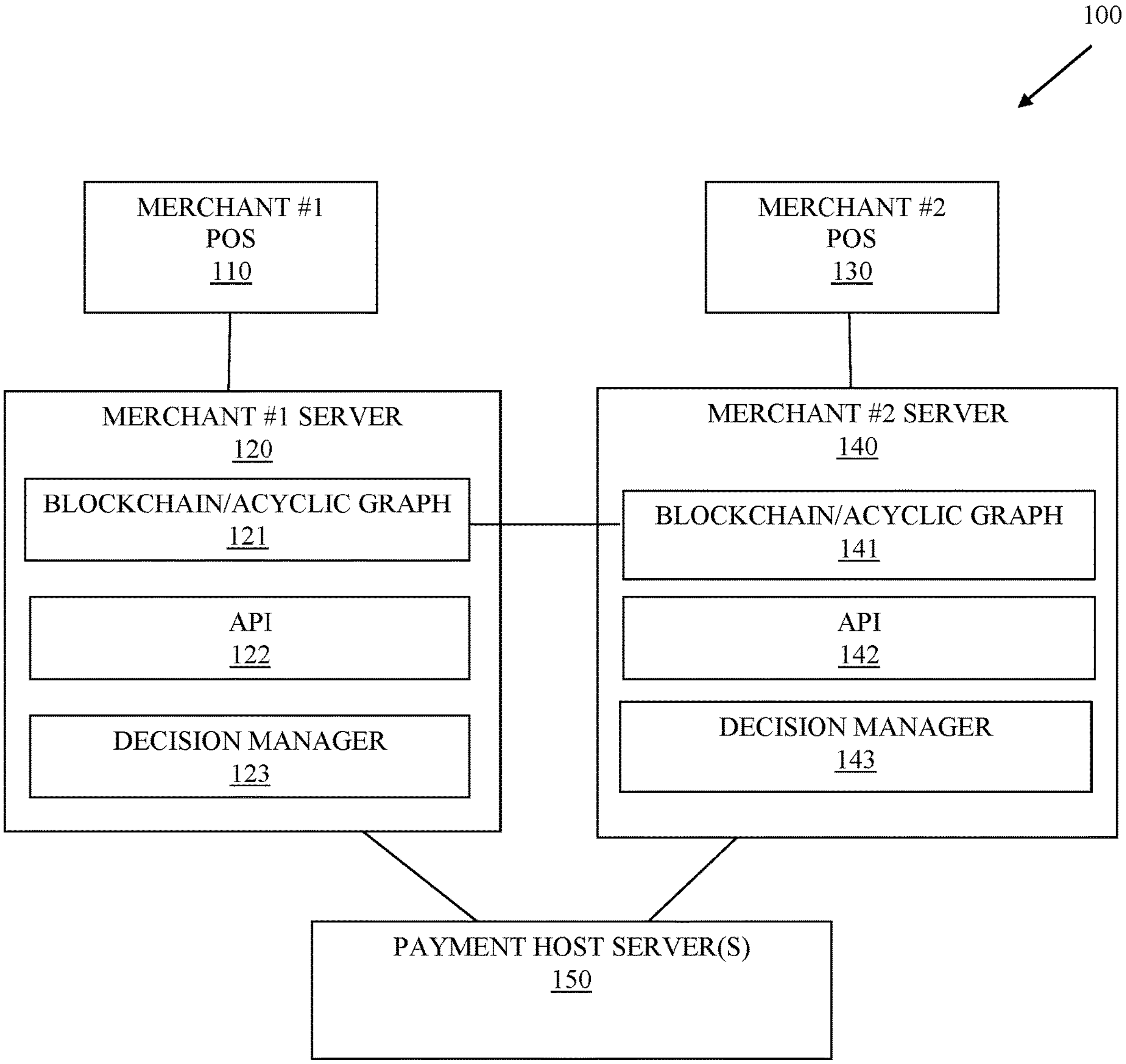
FIG. 1 is a diagram of a system for cooperative fraud-detection processing, according to an example embodiment.

FIG. 1 is a diagram of a system 100 for cooperative fraud-detection processing, according to an example embodiment. The various components are illustrated and the arrangement of the components is presented for purposes of illustration only. It is to be noted that other arrangements with more or less components are possible without departing from the cooperative fraud-detection teachings presented herein and below.

The techniques, methods, and system presented herein and below for cooperative fraud-detection processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein the phrases "payment server," "payment host," and "payment host server," refer to external third-party payment processing systems and can include check processing systems or payment instrument processing systems through which a merchant utilizes for effectuating payment during a transaction from a customer to an account of the merchant.

The system 100 includes: a) a first merchant (merchant #1) Point-Of-Sale (POS) terminal 110; b) a merchant #1 server 120 having a Blockchain (BC)/Acyclic Graph (graph) 121, an Application Programming Interface (API) 122, and a decision manager 123; c) a merchant #2 POS terminal 130; a merchant #2 server 140 having a BC/graph 141, an API 142, and a decision manager 143; and, optionally, d) one or more payment servers 140.

When consumers engage in transactions requiring payment at the POS terminals 110 and 130, the APIs 122 and 142 collect a variety of information for the transactions and submit this information for inclusion to the BC/graphs 121 and 141. The information can be configured based on the needs of the merchant. Identifying data that would uniquely identifying a consumer is not maintained ensuring that the anonymity of the consumers and privacy of the consumers are maintained. Therefore, the information submitted for inclusion in the BC/graphs 121 and 141 does not include complete identifying information (names, addresses, account numbers, date of births, etc.). A portion of the identifying information is; however, included in the information submitted for inclusion in the BC/graphs 121 and 141.

Some of the information submitted to the BC/graphs is provided as hash values for inclusion as hash values within the BC/graphs 121 and 141. Other portions of the information submitted to the BC/graphs 121 and 141 is provided in a text format for inclusion in the BC/graphs 121 and 141.

The APIs 122 and 142 include a common hashing algorithm for use with the transaction information provided by consumers at the POS terminals 110 and 130. The consumer provides the transaction information for payment of goods and services with the merchants. Typically, this is done by the consumer providing a payment instrument (gift card, debit card, credit card, check, and negotiable instrument that can be used by the consumer as payment for a transaction) to a magnetic stripe card reader of the POS terminals 110 and 130. The presentation of the payment instrument may also be done through other techniques, such as Near Field Communication (NFC) or through manual entry of the payment instrument details utilizing a touchscreen, keypad, or encrypted Personal Identification Number (PIN) pad of the POS terminals 110 and 130.

The instrument-provided information typically includes: a customer name, a customer account number, an expiration date for the payment instrument, and a billing zip code or address.

Conventionally, the instrument-provided information is sent to the payment servers (payment hosts) 140, with perhaps some of the instrument-provided information encrypted, such as at least the account number. A network switch identifies the proper payment host 150 through routing information included with the account number. The server 120 or 140 also provides a merchant identifier or merchant account, such that should the payment host 150 complete the processing the merchant account can be properly credited for the payment and for the host 150 to deduct fees from the merchant account for performing the payment transaction. The payment host 150 then performs fraud detection processing and either declines the payment transaction or accepts and completes the payment transaction. Fees are incurred by the merchants in either situation. A notice is then sent to the merchant server 120 or 140 that the payment was declined or accepted. The server 120 or 140 then provides an indication back to the POS terminal 110 or 130 that the transaction successfully completed or was declined.

The above-described conventional payment processing example remains unchanged with the teachings presented herein and below. However, before the processing is sent from the merchant servers 120 and 140, the herein-described processing is performed as a pre-processing technique that allows the merchants to apply their own fraud-detection processing utilizing a cooperated inter-merchant pre-processing technique for determining whether any given transaction will or will not be sent to the host 150 for payment processing. It is noted that when the merchant decides during the cooperative pre-processing technique not to submit a given payment transaction to the hosts 140, the merchant encounters no fees, which the merchant would have incurred if the given payment transaction would have been submitted to the hosts 140 for a payment decision and payment processing. This allows the merchants to cooperate and manage risks with one another for payment transactions before providing the payment transactions to the hosts 140.

After the consumer provides instrument details through presentation of the instrument (through any of the POS interfaces discussed above), the APIs 122 and 142 process a cryptographically strong hashing algorithm on the account number (payment identifier) and instrument expiration date to produce a hash string value. The APIs 122 and 142 also obtain plaintext information for the transaction being performed, such as date and time, merchant identifier, merchant physical location (known for the POS terminals 110 and 130), transaction amount, transaction status, and a predefined number of digits for the account number (such as first 6 digits, last 4 digits, etc.).

The hash value and plain text are provided by the APIs 122 and 142 to their BC/graphs 121 and 141, which are synchronized with one another through their servers 120 and 140. The hash value serves as a key for searching the BC/graphs 121 and 141. The BC/graphs 121 and 141 return in response to the search the plaintext associated with records in the BC/graphs 121 and 141. The plaintext includes a status indication which allows the API 122 and 142 to determine whether the instrument presented for a transaction has been declined, incurred charge backs, accepted, along with dates, times, and transaction amounts for such previous transactions associated with the presented instrument for any given transaction.

The decision manager 123 and 143 receives the plain text search results and can apply its own merchant-specific fraud or risk prevention rules against the plain text search results. For example, a merchant specific rule for merchant #1 that is applied by the decision manager 123 may decline a payment transaction when the plain text search results indicate: chargebacks for the presented instrument within a given time period that exceed a threshold value, a previous transaction within a given period of time that exceeds a geographical distance from the POS terminal 110, the current transaction amount when added to outstanding transaction amounts within a given time period exceeds a threshold value, and any other merchant defined fraud and risk detection rules.

So, each merchant can customize its fraud or risk decisions that are applied before any given payment transaction is submitted or not submitted to the hosts 140. As another example, a particular merchant may include customized fraud or risk decisions with the decision manager 123 that includes loyalty level rules (when provided with the transaction information by the customer).

Furthermore, after the decision manager 123 and 124 make a decision to submit a given payment transaction to the hosts 140, the status of the transaction can be updated within the BC/graphs 121 and 141 through the APIs 122 and 142. The APIs 122 and 142 can also be used for updating the BC/graphs 121 and 141 when a given transaction incurs a chargeback (the customer disputed or reversed the charge for the given transaction). This ensures that the decision manager 123 and 143 has an adequate status when deciding whether to submit a given payment transaction for a given instrument to the hosts 140.

In an embodiment, when a transaction is initially submitted for searching the BC/graphs 121 and 141, the plaintext portion provided by the APIs 122 and 142 can indicate a "pending" status." Once a decision is rendered on transaction, the status is updated to "processed" or "declined," or the status is updated at a subsequent point in time to account for a status of "chargeback."

In an embodiment, a history of transactions at the merchants can be processed in a batch mode by the APIs 122 and 142 for initial population of the BC/graphs 121 and 141.

In an embodiment, each merchant can decide whether or not to include additional plaintext information based on needs or desires of the merchant that is beyond the transaction amount, transaction location, transaction date and time, and subset string of digits representing the account number.

In an embodiment, the BC/graph 121 and 141 is a private BC or acyclic graph that ensures the participating merchants are authenticated and trusted, and which may or may not be maintained separate from the merchants by a third-party organization, which may or may not charge fees for belonging to the BC/graph 121 and 141 processing.

In an embodiment, the BC/graph 121 and 141 is a public BC or acyclic graph arrangement for which the participating merchants are untrusted and maintained cooperatively by the each of the participating merchants.

In an embodiment, the payment host 150 is unnecessary, such as when a merchant receives a check (payment instrument) that is not electronically cashed and is deposited at the end of a day by the merchant with the merchant's bank for subsequent payment. In this case, the system 100 is used for merchant-to-merchant cooperation to assess risk of the merchant with respect to accepting the check for later depositing and cashing by the merchant. The system 100 then provides an added layer of protection and mitigation of risk in accepting the check as payment from the consumer.

In an embodiment, the POS terminals 110 and 130 are one or more of: an Automated Teller Machine (ATM), a Self-Service Terminal (SST), a kiosk, a web-based and web-accessible logical terminal accessible to any processing device through a web-rendered interface, a mobile-application interface rendered within a mobile device operated by the customer or a clerk associated with a merchant, and/or a terminal operated by a clerk at a particular merchant location.

In an embodiment, merchant #1 is associated with a first enterprise and merchant #2 is associated with a different and disparate second enterprise from the first enterprise.

It is to be noted that although the system illustrated depicts just two merchants, the teachings are not so limited and can include an unlimited number of cooperating merchants that utilize and process the BC/graphs 121 and 141.

As demonstrated, the system 100 provides a pre-processing technique for merchants to make their own customized decisions as to whether a given transaction is or is not to be submitted to a payment host 150 by utilizing a cooperative BC/graph 121 and 141. The anonymity of customers involved in transaction represented in the BC/graph 121 and 141 is maintained and the process is completely customer-agnostic this is done through a cooperative strong cryptographic hash performed by the APIs 122 and 142 against specific payment instrument identifiers (account numbers) to produce hash values, which are stored in the BC/graph 121 and 141 as keys for searching and updating specific transactions. The records associated with the keys also include customer-agnostic plain text for transactions (as described above), which can be updated based on transaction status (declined, processed, chargeback) and which can be provided as search results for evaluation by the decision managers 123 and 143 based on each merchant's own customized fraud and risk rules.

The system 100 provides a mechanism for merchants to predict in advance whether hosts 140 are going to accept or decline a given transaction before the merchants submit payment transactions to the hosts 140. The system 100 also provides a mechanism for merchants to avoid submitting payment transactions to the hosts 140 when the merchants believe there is a high risk of subsequent chargebacks for the transaction (which can occur several days or weeks after a given transaction that was successfully submitted and processed by a given host 150). This allows the merchants to reduce host fees for payment transactions and minimize risks of chargebacks for payment transactions. This is a cooperative inter-merchant approach utilizing BC/graphs 121 and 141.

These embodiments and other embodiments are now discussed with reference to the FIGS. 2-4.

Figure 2:
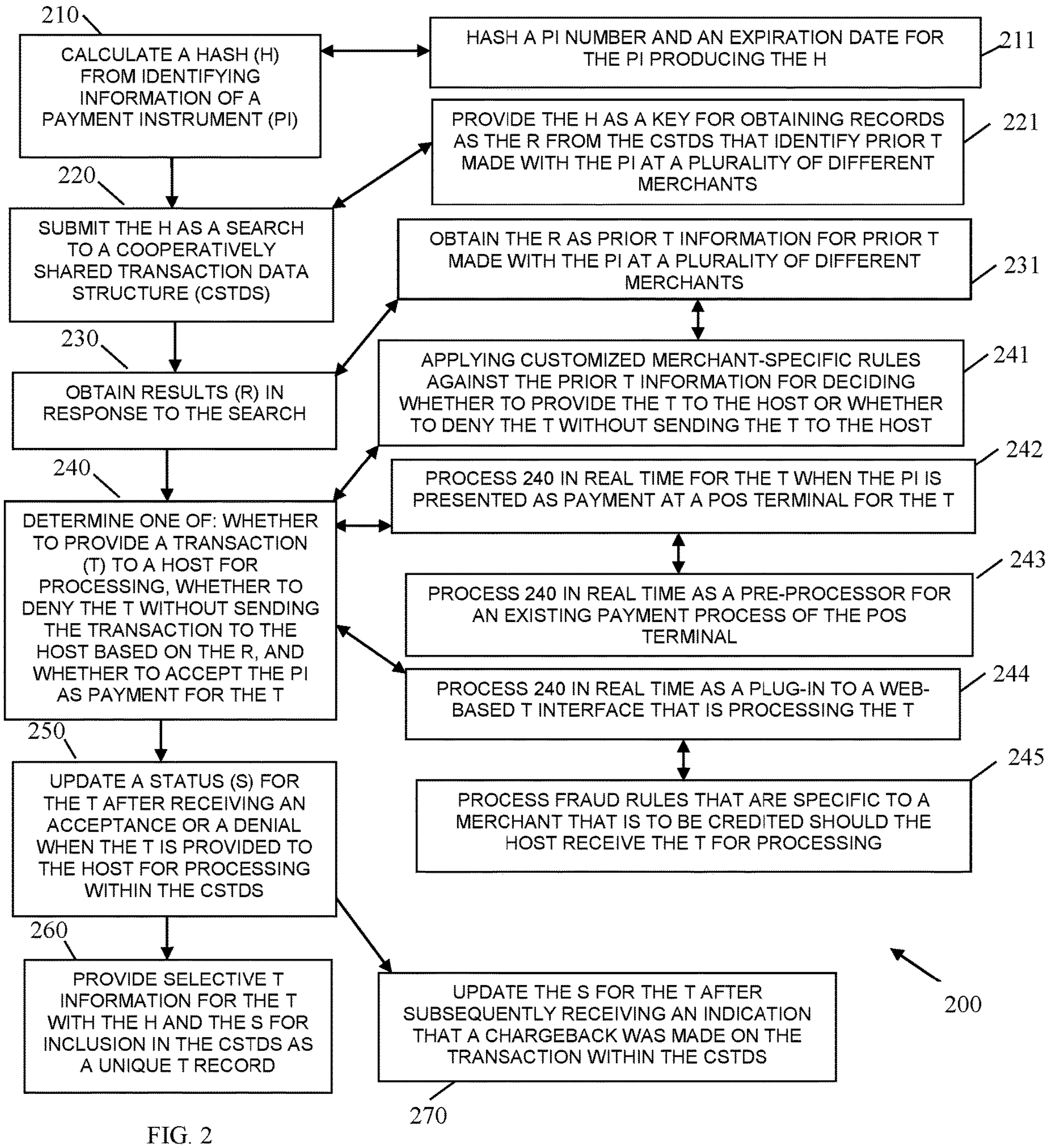
FIG. 2 is a diagram of a method for cooperative fraud-detection processing, according to an example embodiment.

FIG. 2 is a diagram of a method for cooperative fraud-detection processing, according to an example embodiment. The software module(s) that implements the method 200 is referred to as a "cooperative inter-merchant fraud manager." The cooperative inter-merchant fraud manager is implemented as executable instructions programmed and residing within memory and/or a non-transitory computer-readable (processor-readable) storage medium and executed by one or more processors of a device. The processor(s) of the device that executes the cooperative inter-merchant fraud manager are specifically configured and programmed to process the cooperative inter-merchant fraud manager. The cooperative inter-merchant fraud manager has access to one or more networks during its processing. The networks can be wired, wireless, or a combination of wired and wireless.

In an embodiment, the cooperative inter-merchant fraud manager is all or some combination of the modules 121-123 and/or 141-143.

In an embodiment, the device that executes the cooperative inter-merchant fraud manager is the server 120/server 140.

In an embodiment, the device that executes the cooperative inter-merchant fraud manager is a plurality of servers logically organized as a cloud processing environment.

At 210, the cooperative inter-merchant fraud manager calculates a hash from identifying information of a payment instrument. The payment instrument presented for payment of a pending transaction.

According to an embodiment, at 211, the cooperative inter-merchant fraud manager hashes a payment instrument number and an expiration date for the payment instrument to produce the hash.

At 220, the cooperative inter-merchant fraud manager submits the hash as a search to a cooperatively shared transaction data structure, such as the BC/graphs 121 and 141.

In an embodiment, at 221, the cooperative inter-merchant fraud manager provides the hash as a key for obtaining records as the results from the cooperatively shared transaction data structure that identifies prior transactions with the payment instrument at a plurality of different merchants.

At 230, the cooperative inter-merchant fraud manager obtains the results in response to providing the hash as the search.

In an embodiment, at 231, the cooperative inter-merchant fraud manager obtains the results as prior transaction information for prior transactions made with the payment instrument at a plurality of different merchants.

At 240, the cooperative inter-merchant fraud manager determines: 1) whether to provide a pending transaction to a payment host for payment processing, 2) whether to deny the pending transaction without sending the pending transaction to the payment host based on the evaluated results returned from the search, and/or 3) whether to accept the payment instrument as acceptable payment for the transaction when hosts are unnecessary for payment (discussed as one embodiment with the system 100 discussion above).

In an embodiment of 231 and 240, at 241, the cooperative inter-merchant fraud manager applies customized merchant-specific rules against the prior transaction information for deciding whether to provide the pending transaction to the payment host or whether to deny the pending transaction without sending the pending transaction to the payment host.

According to an embodiment, at 242, the cooperative inter-merchant fraud manager processes 240 in real time for the pending transaction when the payment instrument is presented at a POS terminal for the pending transaction.

In an embodiment of 242 and at 243, the cooperative inter-merchant fraud manager processes 240 in real time as a pre-processor for an existing payment process associated with the POS terminal that provides the pending transaction to the payment host for payment processing.

In an embodiment, at 244, the cooperative inter-merchant fraud manager processes 240 in real time as a plug-in to a web-based interface that is processing the pending transaction.

In an embodiment of 244 and at 245, the cooperative inter-merchant fraud manager processes fraud rules that are specific to a merchant that is to be credited should the payment host receive the pending transaction for payment processing. In this embodiment, the fraud rules can be selected by the cooperative inter-merchant fraud manager based on the merchant, such that different fraud rules can be applied when a different merchant is associated with processing different pending transactions. In this embodiment, the decision managers 123 and 143 may be a single instance of a decision manager (single instance of the cooperative inter-merchant fraud manager) servicing each of the cooperating merchants from a cloud processing environment.

According to an embodiment, at 250, the cooperative inter-merchant fraud manager updates a status for the transaction after receiving an acceptance or a denial when the pending transaction is provided to the payment host for payment processing. The updated status is updated to the cooperatively shared transaction data structure.

In an embodiment of 250 and at 260, the cooperative inter-merchant fraud manager provides selective transaction information for the transaction with the hash and the status for inclusion in the cooperatively shared transaction data structure as a unique transaction record. That is the hash, provides the key for updating the unique transaction record with the updated status within the cooperatively shared transaction data structure.

In an embodiment of 250 and at 270, the cooperative inter-merchant fraud manager updates the status a second time after subsequently receiving an indication that a chargeback was made on the transaction within the cooperatively shared transaction data structure.

It is noted that the cooperatively shared transaction data structure processed by the cooperative inter-merchant fraud manager is shared and collaborated on between multiple different merchants.

Figure 3:
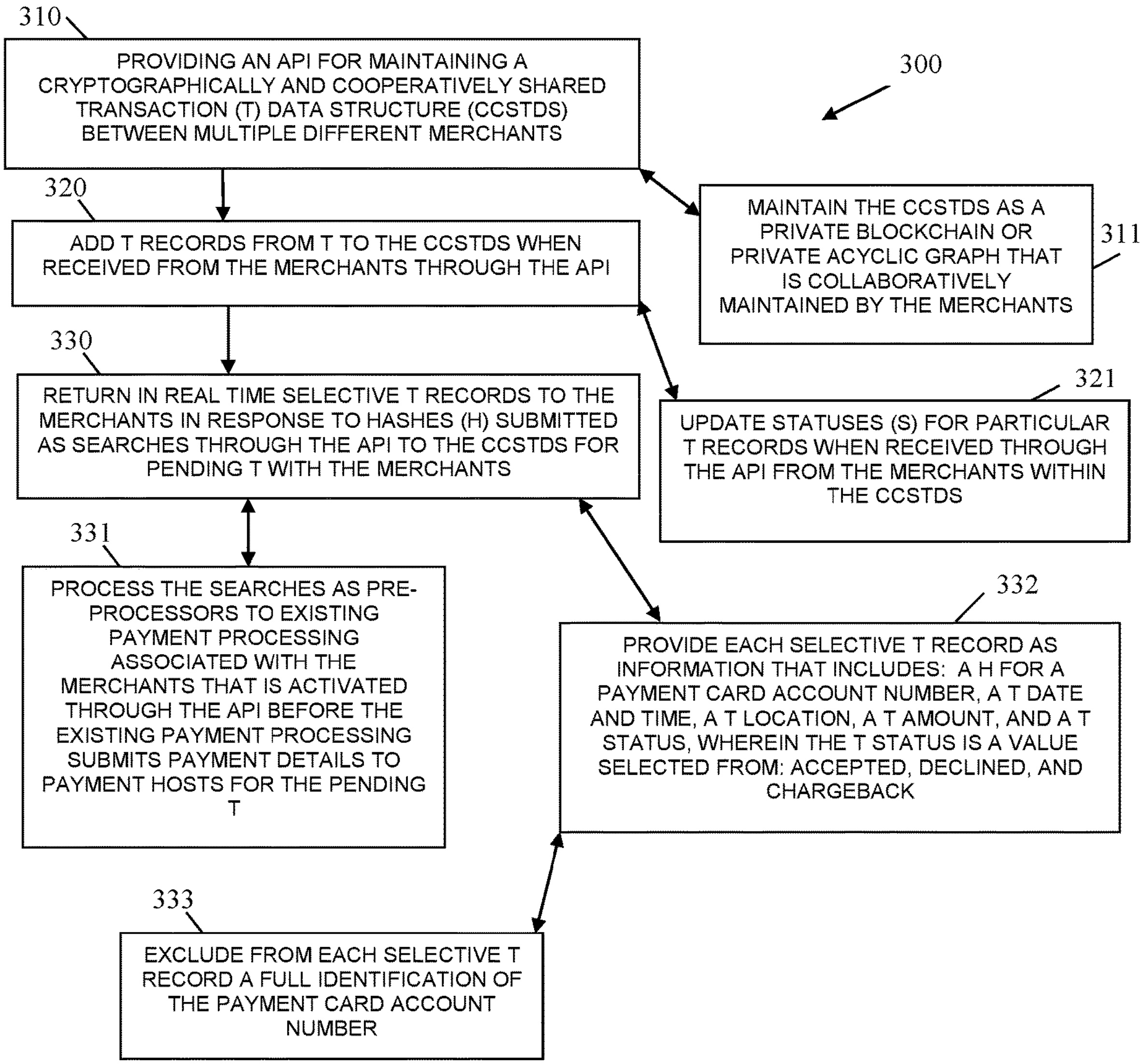
FIG. 3 is a diagram of another method for cooperative fraud-detection processing, according to an example embodiment.

FIG. 3 is a diagram of another method for cooperative fraud-detection processing, according to an example embodiment. The software module(s) that implement the method 300 is referred to herein as a "cooperative risk assessment manager." The cooperative risk assessment manager is implemented as executable instructions and programmed within memory and/or a non-transitory computer-readable (processor-readable) storage medium that executes on one or more processors of a device. The processors of the device are specifically configured to execute the cooperative risk assessment manager. The cooperative risk assessment manager has access one or more networks; the networks can be wired, wireless, or a combination of wired and wireless.

In an embodiment, the cooperative risk assessment manager is all or some combination of the software modules 121-123, 141-143, and/or the method 200.

In an embodiment, the device that executes the cooperative risk assessment manager is the server 120/server 140.

In an embodiment, the device that executes the cooperative risk assessment manager is one of: a wearable processing device, a tablet, a phone, a laptop computer, a computer-based device integrated into or attached to a vehicle.

The cooperative risk assessment manager presents another and in some ways processing perspective from that which was presented above in the method 200 of the FIG. 2.

At 310, the cooperative risk assessment manager provides an API for maintaining a cryptographically and cooperatively shared transaction data structure between multiple different and collaborating merchant systems.

In an embodiment, at 311, the cooperative risk assessment manager maintains the cryptographically and cooperatively shared transaction data structure as a private BC or a private acyclic graph that is collaboratively maintained by the merchants through their merchant systems.

At 320, the cooperative risk assessment manager adds transaction records from transactions to the cryptographically and cooperatively shared transaction data structure when received from the merchant systems through the API.

In an embodiment, at 321, the cooperative risk assessment manager updates statuses for particular transaction records when received through the API from the merchant systems within the cryptographically and cooperatively shared transaction data structure.

At 330, the cooperative risk assessment manager returns in real time selective transaction records to the merchant systems in response to hashes submitted as searches through the API to the cryptographically and cooperatively shared transaction data structure for pending transactions being processed in real time by the merchant systems.

In an embodiment, at 331, the cooperative risk assessment manager processes the searches are pre-processors to existing payment processing associated with the merchant systems that are activated through the API before the existing payment processing submits payment details to payment hosts for the pending transactions.

In an embodiment, at 332, the cooperative risk assessment manager provides each selective transaction record as information that includes: a hash for a payment instrument account number, a transaction date and time, a transaction location (geographic location), a transaction amount, and a transaction status. The transaction status is a value selected from: accepted, declined, and chargeback.

In an embodiment of 332 and at 333, the cooperative risk assessment manager excludes from each selective transaction record a full identification of the payment instrument account number ensuring that the processing of the cooperative risk assessment manager is customer-agnostic and maintains the privacy of the customers.

Figure 4:
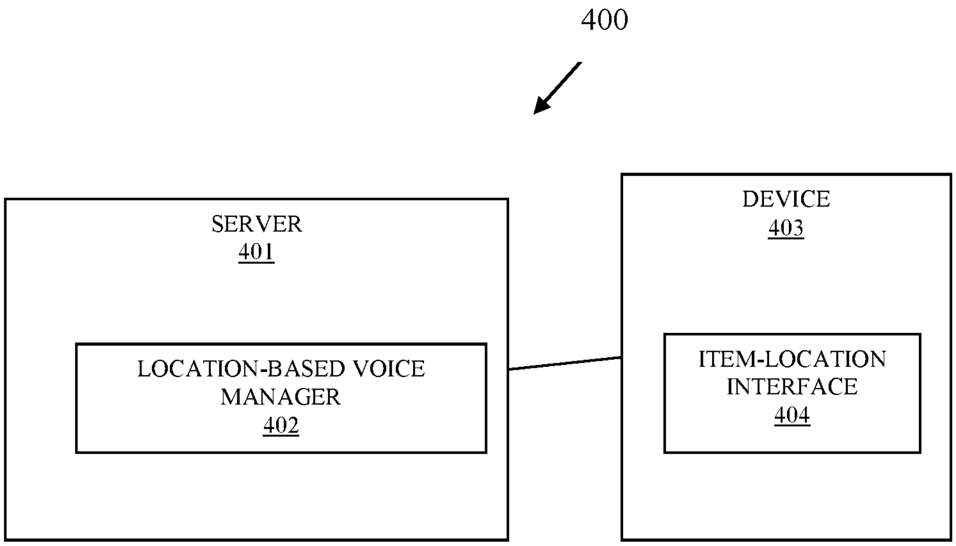
FIG. 4 is a diagram of another system for cooperative fraud-detection processing, according to an example embodiment.

FIG. 4 is a diagram of another system 400 for cooperative fraud-detection processing, according to an example embodiment. The components of the system 400 are programmed and reside within memory and/or a non-transitory computer-readable medium and execute on one or more processors of the devices of the system 400. The system 400 also has access and can communicate over one or more networks; and the networks can be wired, wireless, or a combination of wired and wireless.

The system 400 is configured and programed to perform the processing discussed above with the FIGS. 1-3.

The system 400 includes a server 401 having an inter-merchant cooperative fraud manager 402.

In an embodiment, the server 401 is the server 120/server 140.

In an embodiment, the server 401 is a part of a cloud processing environment.

The inter-merchant cooperative fraud manager 402 executes on at least one hardware processor of the server 401 and is configured to: i) maintain a cryptographic cooperatively shared transaction data structure between multiple different merchants and ii) search the cryptographic cooperatively shared transaction data structure in real time for making decisions on whether to submit a pending transaction to a payment host for a payment decision or whether to decline the pending transaction without sending the pending transaction to the payment host.

In an embodiment, the inter-merchant cooperative fraud manager 402 performs some or all of the processing discussed above for the software modules 121-123, 141-143, the method 200, and/or the method 300.

In an embodiment, the cryptographic cooperatively shared transaction data structure is the BC/graphs 121 and 141.

In an embodiment, the cryptographic cooperatively shared transaction data structure is a private BC or a private acyclic graph that the merchants subscribe to and that provides authentication for access to the cryptographic cooperatively shared transaction data structure.

In an embodiment, the pending transaction originates on one of a web server, a SST, a POS terminal operated by a clerk for one of the merchants, a network-voice enabled appliance/device (Amazon Echo®, Google Home®, etc.), a mobile device (phone, laptop, tablet, wearable processing device, etc.), and a device/appliance the participates in the Internet-of-Things (IoTs).

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

executing, by a processor, of a server executable instructions obtained from a non-transitory computer-readable storage medium causing the processor to perform operations comprising:

obtaining, via a first application programming interface (API), identifying information associated with a payment instrument from a terminal during payment processing for a payment of a transaction being performed by a customer with a given retailer on the terminal, wherein the terminal comprises a Point-Of-Sale (POS) terminal or a Self-Service Terminal (SST) of the given retailer, wherein the first API obtains the identifying information when the customer inserts a payment card into a card reader when the payment is due for the transaction at the POS terminal or the SST;

before a host is provided the identifying information and transaction details of the transaction for completing the payment processing on behalf of the customer and the given retailer, performing preprocessing to custom detect potential fraud associated with the transaction, comprising:

obtaining risk prevention rules specific for the transaction that are specific to the given retailer;

calculating a hash from the identifying information of a payment instrument, by processing a cryptographic hashing algorithm on an account number obtained from the identifying information and an expiration date for the payment instrument obtained from the identifying information and producing the hash;

wherein the first API includes a hashing algorithm for use with the transaction information;

wherein the first API collects the transaction information and submits the transaction information for inclusion to a private blockchain;

wherein the first API processes the hash as a key for searching and updating specific transactions within the private blockchain;

submitting the hash and plaintext comprising a date and time of the transaction, a retailer identifier, a known physical location of the terminal, a transaction amount, and a subset of digits from the account number as a search to the private blockchain to obtain records of prior transactions associated with the payment instrument;

applying customizable risk prevention rules set by the given retailer against the records, wherein the risk prevention rules are customized and specific to the given retailer;

assigning a pending status for the transaction indicating that the payment processing for the payment of the transaction is pending for a fraud review based on a comparison;

based on applying processing one of:

sending the identifying information and the transaction details for the transaction to the host that performs the payment processing and obtains the payment on behalf of the given retailer; or sending a transaction denial to the terminal indicating that the payment processing cannot be performed for the transaction since fraud is present based on application of the risk prevention rules and without sending the identifying information and the transaction details to the host, wherein the host is a payment server that processes the payment for the transaction based on the payment card;

providing the method as a pre-processing technique for the given retailer to make customized decisions as to whether the transaction is to be submitted to the host by utilizing the private blockchain and allows the given retailer to predict in advance whether the host is going to accept or decline the transaction before the given retailer submits the transaction to the host, thereby reducing host fees for payment transactions and minimizing risks of chargebacks for payment transactions;

wherein the private blockchain is maintained as a private blockchain arrangement that ensures participating merchants are authenticated and trusted, and which enables merchant-to-merchant cooperation to assess risk before submitting payment transactions to the host and wherein the records associated with the hash include customer-agnostic plain text for transactions, which can be updated based on transaction status and which can be provided as search results for evaluation based on customized fraud and risk rules, and wherein the hash serves as a key for searching the private blockchain and the private blockchain returns in response to the search the plaintext associated with records in the private blockchain; and updating, by the first API, a status of the transaction within the private blockchain from the pending status to one of a processed status when the identifying information and transaction details are sent to the host or a chargeback status when the transaction denial is sent to the terminal, wherein the updated status is stored in the private blockchain as part of a unique transaction record that comprises the hash, selective transaction information selected from the transaction details, and the updated status; and maintaining, by the first API, anonymity of the customer during the preprocessing by excluding complete identifying information of the customer from the private blockchain and storing only the hash of the account number and expiration date as a customer-agnostic key in the private blockchain, such that the private blockchain operates without retaining any full account number, customer name, address, or date of birth associated with the customer.

2. The method of claim 1, wherein sending of the identifying information and the transaction details to the host further includes updating the pending status to a processed status based on the sending of the identifying information and the transaction details to the host.

3. The method of claim 2 further comprising, creating a unique transaction record that comprises the hash, selective transaction information that is selected from the transaction details, and the processed status and further adding the unique transaction record to the private blockchain.

4. The method of claim 1, wherein sending the transaction denial further includes updating the pending to a chargeback status based on the sending of the transaction denial to the terminal, creating a unique transaction record that comprises, the hash, selective transaction information that is selected from the transaction details, and the chargeback status, and further adding the unique transaction record to the private blockchain.

* * * * *